United States Patent [19]

Yonemura

[11] Patent Number: 4,727,750

[45] Date of Patent: Mar. 1, 1988

[54] STEAM LEAKAGE MEASURING DEVICE

[75] Inventor: Masao Yonemura, Hyogo, Japan

[73] Assignee: TLV Co., Ltd., Hyogo, Japan

[21] Appl. No.: 25,163

[22] Filed: Mar. 12, 1987

[30] Foreign Application Priority Data

Mar. 14, 1986 [JP] Japan .............................. 61-57499

[51] Int. Cl.$^4$ .............................................. G01M 3/08
[52] U.S. Cl. .......................................... 73/46; 73/592
[58] Field of Search ................ 73/40, 40.5 R, 46, 592

[56] References Cited

U.S. PATENT DOCUMENTS 4,532,795  8/1985  Brayman et al. ...................... 73/40

FOREIGN PATENT DOCUMENTS 169763  9/1985  Japan .................................... 73/592

Primary Examiner—Jerry W. Myracle
Attorney, Agent, or Firm—Toren, McGeady & Associates

[57] ABSTRACT

A steam leakage measuring device particularly for use in a steam trap having a detector member which includes a vibration sensor and a temperature sensor which are connected separately to a signal processing or arithmetic unit receiving and processing the temperature and vibration signals from the detector member. The temperature sensed by the temperature sensor is converted into a saturated pressure measurement and a true steam leakage measurement is developed in the signal processing unit based upon a predetermined relationship between the sensed vibration level and a leakage measurement for a particular developed pressure level.

3 Claims, 2 Drawing Figures

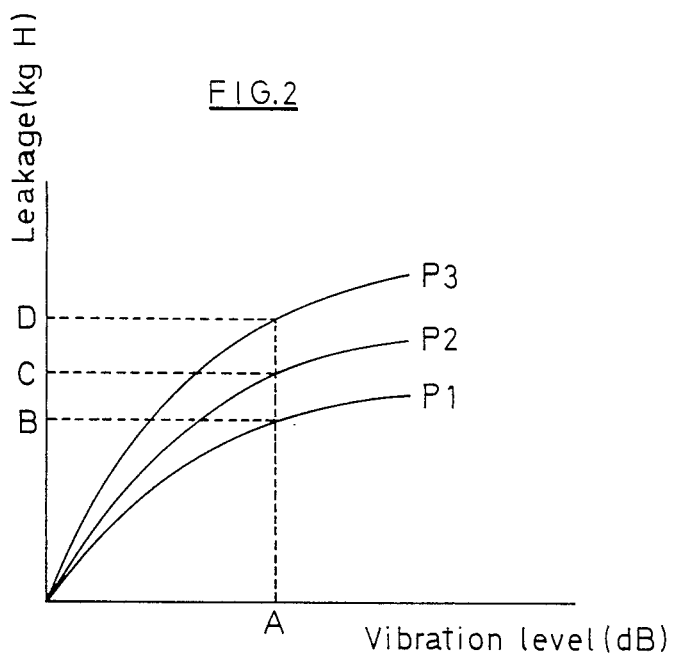

STEAM LEAKAGE MEASURING DEVICE

BACKGROUND OF THE INVENTION

1. Field of the Invention

The present invention relates generally to steam apparatus and more particularly to a steam leakage measuring device which is used to check the operating condition of a valve of a steam trap or other steam device. More specifically, the invention is of the type which operates by detecting vibrations taking place with the operation of the valve.

2. Description of the Prior Art

Steam leakage detectors are known in the prior art and an example of such a device is disclosed in Japanese Utility Model Laid-Open No. 58-187739. This device determines the presence or absence of steam leaks by detecting vibrations that take place when the steam is leaking. A detecting needle which is set on an object to be measured is mounted on a casing of a probe. The vibrations of the detecting needle are converted into electric oscillations by the use of an ultrasonic microphone using a piezoelectric element, and the electric signal is amplified, thus moving a meter pointer and sounding a speaker.

The aforementioned device, operating the meter pointer and the speaker by detecting vibrations from the detecting needle, is capable of detecting a vibration level. However, this device still presents a problem in that no accurate measurement of steam leakage can be made because the leakage varies with the steam system pressure, if the vibrations are at the same level.

SUMMARY OF THE INVENTION

The present invention is directed to providing a device which will enable accurate measurement of steam leakage.

Briefly, the present invention comprises a detector including a vibration sensor and a temperature sensor which are built in, and an arithemetic unit which processes electric signals from the aforementioned sensors as input and judges the operating condition of an object under measurement.

When the tip of the detector is applied to an object under measurement, such as a valve casing of a steam trap, vibrations of the object under measurement act on the vibration sensor which, in turn, creates electrical oscillation or voltage fluctuation in accordance with changes in mechanical pressure resulting from the vibrations. This voltage fluctuation is applied as an input into the arithmetic unit. At the same time, the temperature sensed by the temperature sensor is applied as an input into the arithmetic unit. The arithmetic unit converts the signal from the temperature sensor into a saturated pressure in relation to the temperature measured and also performs the operation and indication of a true steam leakage measurement in relation to the steam system pressure which corresponds to the steam system pressure from a relation between the vibration level and the leakage by using the pressure as a parameter.

Accordingly, since the vibration level detected is computed and indicated, it is possible to accurately measure steam leakage.

The present invention provides particular advantages.

Since steam pressure is taken into consideration, the device is capable of more accurate measurement of steam leakage than prior art devices and facilitates the judgment of quality of the object under measurement.

Furthermore, since the device automatically performs operations of all measurements, any manipulation error in measurement can be eliminated and a correct result of the measurement can be obtained.

Furthermore, since the detector has a vibration sensor and a temperature sensor built in, both vibration and temperature can be detected simultaneously in one measuring operation which, therefore, can be carried out efficiently.

The various features of novelty which characterize the invention are pointed out with particularity in the claims annexed to and forming part of this disclosure. For a better understanding of the invention, its operating advantages and specific objectives attained by its use, reference should be had to the drawings and descriptive matter in which there is illustrated and described a preferred embodiment of the invention.

BRIEF DESCRIPTION OF THE DRAWINGS

In the drawings:

FIG. 2 is a graph showing a relationship between vibration levels and leakage at different pressure levels obtained experimentally.

DETAILED DESCRIPTION OF THE PREFERRED EMBODIMENT

Figure 1:
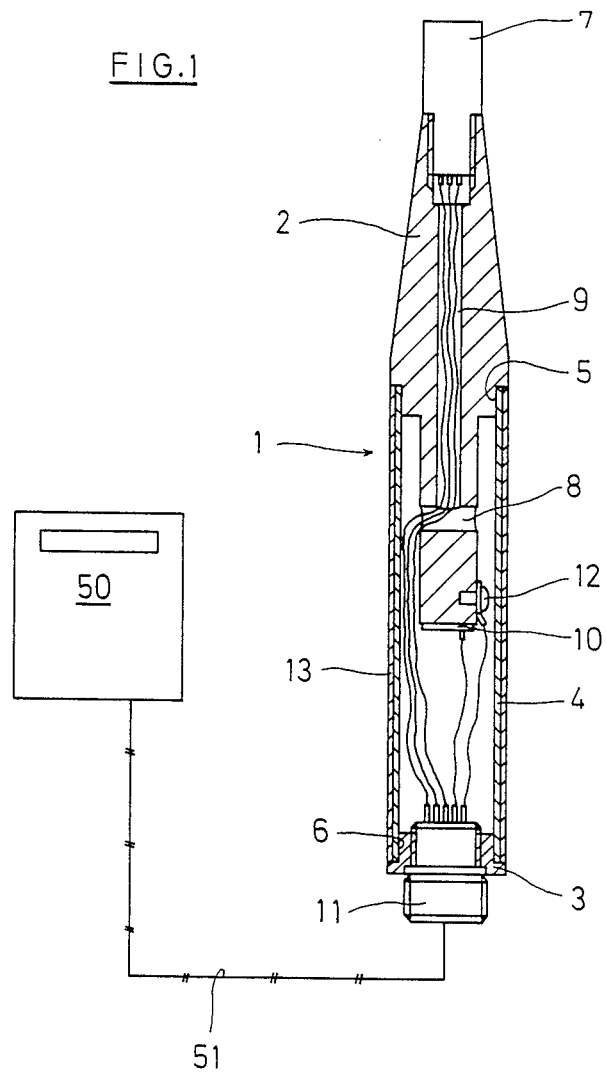
FIG. 1 is a schematic diagram showing an embodiment of the present invention with a detector member thereof being shown in sectional view.

Referring now to the drawings, a preferred embodiment of the invention is shown in FIG. 1 as consisting essentially of a detector 1, an arithmetic unit 50, and a cable 51 connecting both devices. The detector 1 is formed by pressing a front end member 2 and a rear end member 3 into tight engagement in a cylindrical body 4.

The cylindrical body 4 is covered with a rubber coating 13 on the outside surface to avoid slippage during use. Fitting sections 5 and 6 between the end members 2 and 3, respectively, and the body 4 are provided with spline knurls to prevent detachment from the cylindrical body 4.

The upper half section of the front end member 2 is conical, while the lower half section thereof is cylindrical and of smaller diameter than the middle section. There are provided in the members 2 a longitudinal cavity 9 formed from the top end through to the center section of the lower cylinder section thereof, and a lateral cavity 8 formed across the longitudinal cavity 9. In the top end of the member 2, there are formed internal screw threads into which a temperature sensor 7 (temperature measuring resistor) is screwed. In the bottom end of the lower end section of the member 2, there is installed a vibration sensor 10 (piezoelectric element). This contact surface serves also as the ground of the vibration sensor.

A five-pin connector 11 is screwed into the rear end member 3. For an internal connection, three conductors from the temperature sensor 7 are passed through the longitudinal hole 9 and the lateral hole 8 and two conductors, one from the vibration sensor 10 and the other from a terminal attached by a screw 12 on the vibration sensor, are connected to the terminal of the connector 11.

The arithmetic unit 50 consists essentially of signal processing means comprising a functional section for the processing of signals from the vibration sensor 10 and the temperature sensor 7 of the detector, an amplifier, an A/D converter and a display section.

In the operation of the device described above, when the temperature sensor 7 at the top of the detector 1 is applied to an object to be measured, a temperature signal is transmitted to the arithmetic unit 50 directly through a conductor and, at the same time, mechanical vibrations are transmitted to the vibration sensor 10 through the front end member 2 and are applied as a signal to the arithmetic unit 50.

The arithmetic unit 50 converts the signal coming from the temperature sensor 7 into a saturated pressure in relation to the temperature measured. Also, it stores information defining a relationship between the vibration level corresponding to the steam system pressure and the steam leakage, which relationship is shown in the graph in FIG. 2. This graph uses the pressure as a parameter to show the relationship between the vibration level and the leakage. As seen from this, the leakage varies largely (Points B, C and D) with pressure if the vibrations are at the same level (Point A). Here, the pressure relation is $P1 < P3$. From this pressure and the vibration level, steam leakage is computed and displayed.

While a specific embodiment of the invention has been shown and described in detail to illustrate the application of the inventive principles, it will be understood that the invention may be embodied otherwise without departing from such principles.

What is claimed is:

1. A device for measuring steam leakage particularly in a steam device comprising: detector means including vibration sensor means for sensing vibration and temperature sensor means for sensing temperature; and signal processing means consisting of an arithmetic unit receiving and processing signals representative of a vibration level and of a temperature level in said steam device developed from said detector means for determining steam leakage based upon said processed signals.

2. A device according to claim 1, further comprising signal transmission means for separately transmitting to said signal processing means signals from said vibration sensor means and signals from said temperature sensor means.

3. A device according to claim 2, wherein said signal processing means operates to determine a pressure level based upon signals received from said temperature sensor means and to determine steam leakage based upon a predetermined relationship between steam leakage levels and vibration levels for given pressure levels.

* * * * *